United States Patent
Coulomb et al.

(10) Patent No.: US 7,991,844 B2
(45) Date of Patent: Aug. 2, 2011

(54) METHOD, SYSTEM AND COMPUTER PROGRAM PRODUCT FOR PROCESSING A PLURALITY OF ELECTRONIC MAIL FILES

(75) Inventors: Beatrice Coulomb, Cagnes sur Mer (FR); Stephane Lebrun, Biot (FR); Gerard Marmigere, Drap (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 11/484,470

(22) Filed: Jul. 11, 2006

(65) Prior Publication Data

US 2007/0130266 A1 Jun. 7, 2007

(30) Foreign Application Priority Data

Jul. 12, 2005 (EP) .................................. 05300577

(51) Int. Cl.
*G06F 3/048* (2006.01)
*G06F 15/16* (2006.01)
(52) U.S. Cl. ........................ 709/206; 715/840
(58) Field of Classification Search .................. 709/206; 711/122; 710/68; 715/700, 810, 835, 840
See application file for complete search history.

(56) References Cited

U.S. PATENT DOCUMENTS

| | | | | |
|---|---|---|---|---|
| 4,658,904 A * | 4/1987 | Doremus et al. | ............... | 166/336 |
| 5,091,139 A * | 2/1992 | Chao et al. | ................... | 376/216 |
| 5,323,452 A * | 6/1994 | Dickman et al. | ......... | 379/201.04 |
| 5,377,354 A | 12/1994 | Scannell et al. | ............... | 395/650 |
| 5,515,492 A * | 5/1996 | Li et al. | .......................... | 715/744 |
| 6,044,437 A * | 3/2000 | Reinders | ....................... | 711/122 |
| 6,144,986 A * | 11/2000 | Silver | ............................ | 709/201 |
| 6,154,740 A | 11/2000 | Shah | ................................ | 707/7 |
| 6,223,322 B1 * | 4/2001 | Michigami et al. | ........... | 714/769 |
| 6,327,791 B1 * | 12/2001 | Norcross et al. | ................ | 33/706 |
| 6,467,000 B1 * | 10/2002 | Reinders | ......................... | 710/68 |
| 7,181,495 B2 * | 2/2007 | Skladman et al. | ............. | 709/206 |
| 2002/0043943 A1 * | 4/2002 | Menzer et al. | ................. | 315/291 |
| 2002/0091700 A1 * | 7/2002 | Steele et al. | .................. | 707/100 |
| 2002/0099996 A1 * | 7/2002 | Demura et al. | ................. | 714/769 |
| 2008/0243959 A1 * | 10/2008 | Bacastow et al. | ............. | 707/204 |

OTHER PUBLICATIONS

Found it! (I have a divergent version of MailMan), The Dragon De Monsyne, May 1, 1998.*
Microsoft Office Outlook 2003 SP2 screen captures.*
MailMan Mailing List Manager, http://www.list.org, archive of Dec. 2, 1998, available online at http://web.archive.org.*
"Cleaning up your Subject Lines," Andreas Arning, Jul. 12, 2004.*
"Feature Requests: Move ticket # position to end," Jeff, Oct. 3, 2004.*

* cited by examiner

*Primary Examiner* — Joseph E Avellino
*Assistant Examiner* — James E Conaway
(74) *Attorney, Agent, or Firm* — Schmeiser, Olsen & Watts; John Pivnichny

(57) ABSTRACT

A method of processing a plurality of electronic mail files is disclosed, wherein each electronic mail file includes a subject field having one or more strings comprising the steps of establishing a list of strings, checking the first string in the subject field of each electronic mail file to determine whether the first string matches any of the strings in the list, removing any first strings that match a string in the list and replacing the first string elsewhere in the subject field, and sorting the electronic mail files according to their subject field.

15 Claims, 3 Drawing Sheets

METHOD, SYSTEM AND COMPUTER PROGRAM PRODUCT FOR PROCESSING A PLURALITY OF ELECTRONIC MAIL FILES

TECHNICAL FIELD OF THE INVENTION

The present invention relates to a method, system and computer program product for processing a plurality of electronic mail files to enable subject-based sorting of the electronic mail files by ignoring a list of pre-defined prefixes.

BACKGROUND ART

With increased use of electronic communications, email has become a critically important service for many companies. However, for many individuals, the growing volume of email they receive on a daily basis is becoming increasingly difficult to manage. In particular, the increased volume of email communications can make it difficult to follow the thread of an email conversation or discussion.

An email typically includes a subject field that contains one or more strings identifying the topic of the email. When an email is issued in reply to a first email, the subject field of the reply email may start with the string "Re: " followed by the contents of the subject field of the first email. Only one instance of the string "Re: " should appear in the subject field of a reply email, since the use of other strings or more than one instance of the "Re: " string can lead to undesirable consequences.

The subject field of an email may also start with the string "Fw: " (when the email is being forwarded to other individuals) or other prefixes such as "URGENT: ", "Confidential: " etc.

The presence of prefixes in the subject field of an email (when replying to an email or forwarding an email), can make it difficult to sort emails on the basis of their subject field. In particular, the resulting list of sorted emails is typically polluted by several combinations of prefixes that prevent the rapid identification of searched emails.

U.S. Pat. No. 5,377,354 discloses a method and apparatus for prioritizing a plurality of incoming electronic mail messages according to user-created rules. Similarly, U.S. Pat. No. 6,154,740 discloses a system and method of displaying a sorted list, wherein the sorting operation is performed on the basis of several key fields. However, none of these documents provides a mechanism for ignoring prefixes in email to facilitate the sorting thereof.

SUMMARY OF THE INVENTION

According to an aspect of the invention there is provided a method of processing a plurality of electronic mail files, wherein each electronic mail file includes a subject field of one or more strings, the method comprising the steps of establishing a list of strings, checking the first string in the subject field of each electronic mail file to determine whether the first string matches any of the strings in the list of strings, removing the first string that matches a string in the list and replacing the first string elsewhere in the subject field and thereby producing a revised subject field, and sorting the electronic mail files according to the revised subject field.

According to another aspect of the invention there is provided a system for processing a plurality of electronic mail files, wherein each electronic mail file includes a subject field of one or more strings, the system comprising means for establishing a list of strings, means for checking the first string in the subject field of each electronic mail file to determine whether the first string matches any of the strings in the list of strings, means for removing the first string that matches a string in the list and replacing the first string elsewhere in the subject field and thereby producing a revised subject field, and means for sorting the electronic mail files according to the revised subject field.

According to yet another aspect of the invention there is provided a computer program product stored on a medium readable by a computer machine, the computer program product tangibly embodying a readable program means for causing the computer machine to perform the method of processing a plurality of electronic mail files, wherein each electronic mail file includes a subject field of one or more strings, the method comprising the steps of establishing a list of strings, checking the first string in the subject field of each electronic mail file to determine whether the first string matches any of the strings in the list of strings, removing the first string that matches a string in the list and replacing the first string elsewhere in the subject field and thereby producing a revised subject field, and sorting the electronic mail files according to the revised subject field.

BRIEF DESCRIPTION OF THE DRAWINGS

An embodiment of the invention will now be described by way of example only, with reference to the accompanying Figures in which.

DETAILED DESCRIPTION OF THE PREFERRED EMBODIMENT

Figure 1:
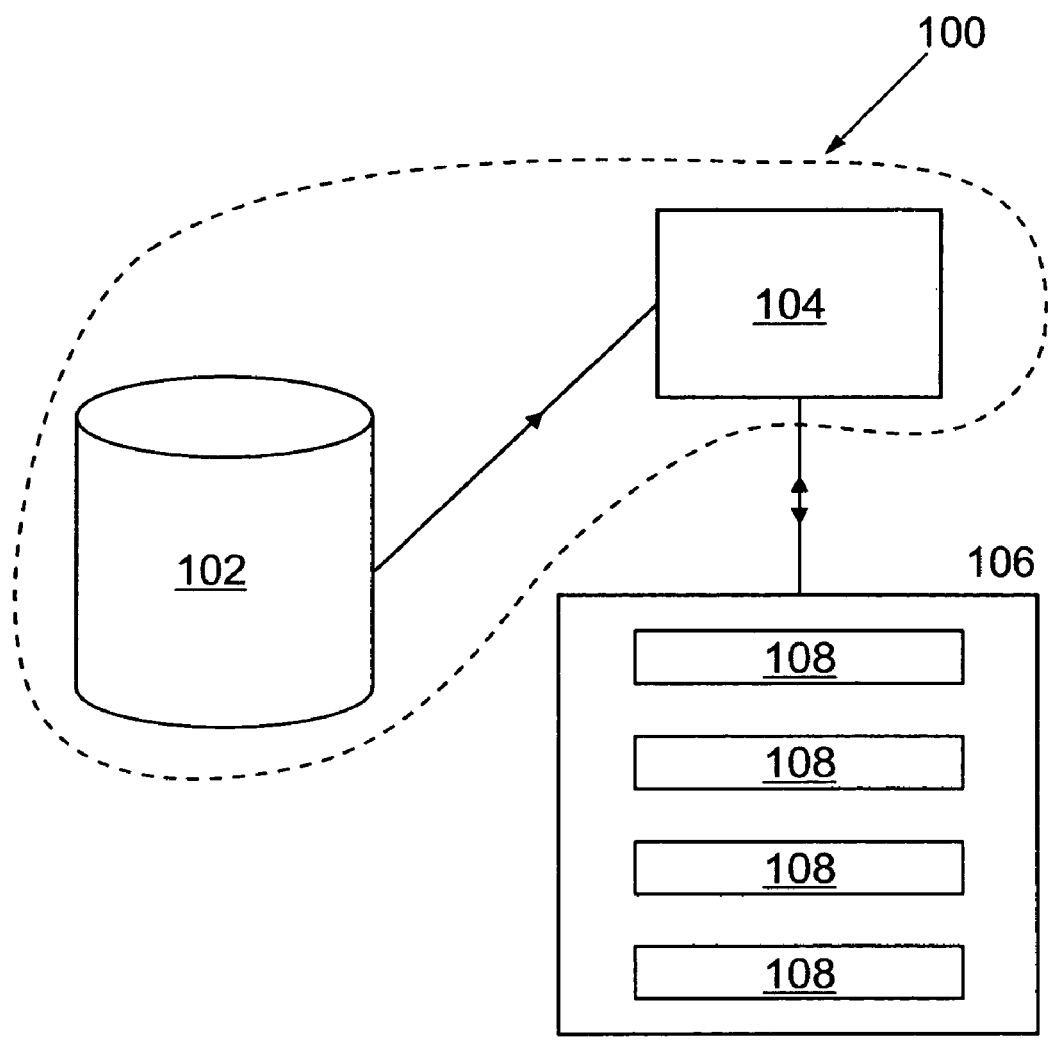
FIG. 1 is a diagram of the architecture of the system for processing email in accordance with a first aspect of the invention.

Referring to FIG. 1, the system for processing email 100 comprises a list of prefixes 102 and a sorting manager 104. The list of prefixes 102 may take the form of a text list or a table etc. A prefix contained in the list of prefixes 102 will be known henceforth as a designated prefix. In use, the system for processing email 100 operates on a mail system 106 comprising a plurality of mail files 108 that may be created, modified and/or displayed by a mail program (e.g. Notes (trade mark) from Lotus Corporation or Outlook (trade mark) from Microsoft).

In use, sorting manager 104 manages the list of prefixes 102 by facilitating the initial configuration of, and subsequent updates to, the list of prefixes 102 (e.g. by updating, adding or removing prefixes.) Sorting manager 104 also operates on the subject field of mail files 108 to detect the presence of designated prefixes therein.

Figure 2:
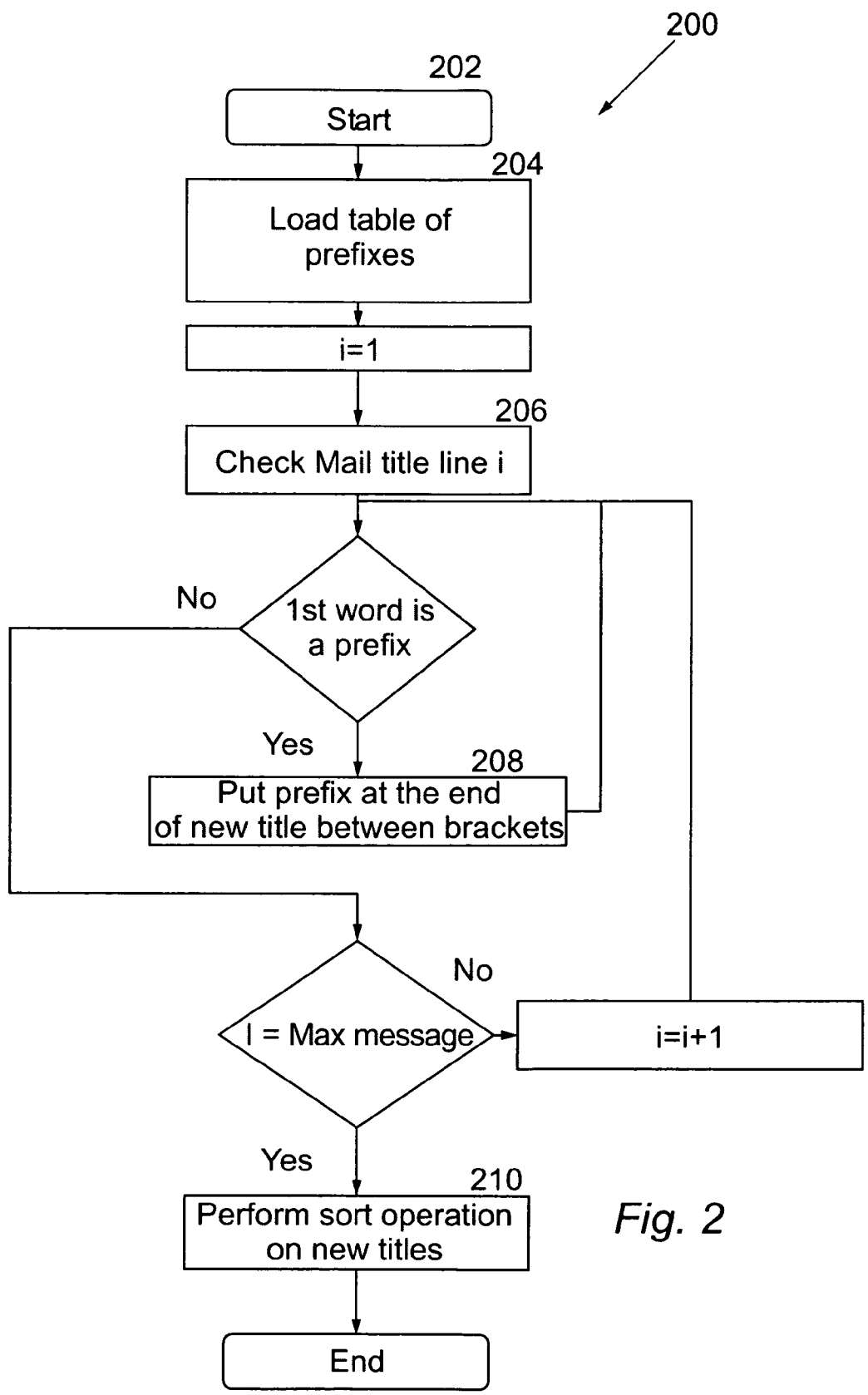
FIG. 2 is a flow chart of the method of processing email in accordance with a second aspect of the invention.

Referring to FIGS. 1 and 2, on starting 202 a method of processing email 200, list of prefixes 102 is loaded at step 204 into a local repository. The subject field of the first mail file 108 is checked at step 206 to determine whether its subject field contains a designated prefix. In the event that the first string in the subject field is a designated prefix, the first string is deleted from the front of the subject field and re-inserted at step 208 into the end of subject field (e.g. between brackets). In the event that the first string in the subject field is not one of the designated prefixes, the subject field is not altered. The system for processing performs the same checking and subject field amendment operations for remaining mail files 108 in mail system 106.

Once the system for processing email has completed the above operations (i.e. it has checked and amended/left unamended last mail file 108 in mail system 106), the system for processing email performs a standard sorting operation 210 on the resulting subject fields of the mail files.

Figure 3:
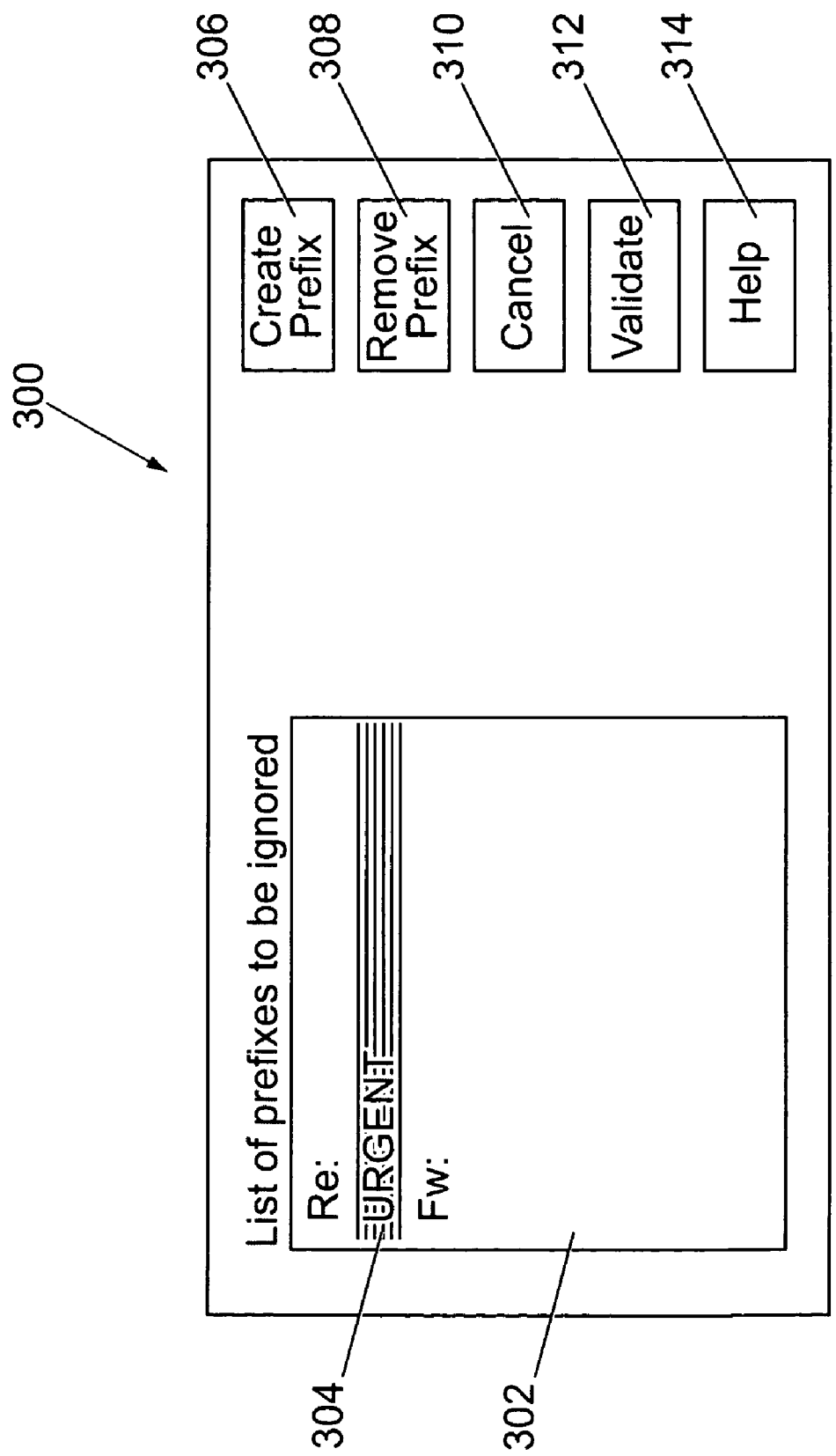
FIG. 3 is a block diagram of an output from the method depicted in FIG. 2.

Referring to FIG. 3, the user interface 300 to the system for processing email comprises a prefix area 302 that lists designated prefixes, any of which may be selected 304 by a user. User interface 300 also includes several buttons, for instance a "Create Prefix" button 306, "Remove Prefix" button 308, "Cancel" button 310, "Validate" button 312 and "Help" button 314. "Create Prefix" button 306 allows a user to add a new prefix to prefix area 302 (and thus list of prefixes 102). "Remove Prefix" button 308 allows a user to remove a selected prefix 304 from prefix area 302. "Cancel" button 310 allows a user to cancel any current actions and "Validate" button 312 validates all the current actions performed by the user.

Alterations and modifications may be made to the above without departing from the scope of the invention.

What is claimed is:

1. A method of processing a plurality of electronic mail files, wherein each electronic mail file includes a subject field of one or more strings, the method comprising:
    a computer machine checking a first string in the subject field of each electronic mail file against a list of prefixes to determine whether the first string matches any of the prefixes in the list of prefixes;
    said computer machine removing the first string that matches a prefix in the list of prefixes and reinserting the first string at the end of the subject field and thereby producing a revised subject field; and
    performing a sorting operation on the revised subject fields of the electronic mail files after each electronic mail file has been checked against the list of prefixes;
    said computer machine displaying a user interface to a user, wherein the user interface simultaneously displays both a prefix area and buttons, said prefix area displaying the prefixes in the list of prefixes as consecutive rows of text in the prefix area, a totality of text in each row of text in the prefix area consisting of one unique prefix in the list of prefixes, said prefix area and buttons being simultaneously viewable in different spatially non-overlapping regions of the user interface, said buttons displayed in consecutive rows of buttons within a portion of the user interface that is external to the prefix area,
    a totality of buttons in each row of buttons consisting of one unique button of said buttons, said unique buttons sequenced in a first direction within the user interface, said unique prefixes sequenced in said first direction within the user interface
    wherein said buttons being simultaneously displayed to the user consist of:
        a Create Prefix button whose functionality consists of enabling addition of a new prefix to the currently displayed prefixes in the prefix area;
        a Remove Prefix button whose functionality consists of enabling removal a selected prefix from the prefix area;
        a Cancel button whose functionality consists of enabling cancellation of a current action;
        a Validate button whose functionality consists of enabling validation of all current actions by the user; and
        a Help button.

2. A computer program product stored on a non-signal storage medium readable by a computer machine, the computer program product tangibly embodying a readable program means for causing the computer machine to perform a method of processing a plurality of electronic mail files, wherein each electronic mail file includes a subject field of one or more strings, the method comprising:
    checking a first string in the subject field of each electronic mail file against a list of prefixes to determine whether the first string matches any of the prefixes in the list of prefixes;
    removing the first string that matches a prefix in the list of prefixes and reinserting the first string at the end of the subject field and thereby producing a revised subject field; and
    performing a sorting operation on the revised subject fields of the electronic mail files after each electronic mail file has been checked against the list of prefixes;
    displaying a user interface to a user, wherein the user interface simultaneously displays both a prefix area and buttons, said prefix area displaying the prefixes in the list of prefixes as consecutive rows of text in the prefix area, a totality of text in each row of text in the prefix area consisting of one unique prefix in the list of prefixes, said prefix area and buttons being simultaneously viewable in different spatially non-overlapping regions of the user interface,
    said buttons displayed in consecutive rows of buttons within a portion of the user interface that is external to the prefix area,
    a totality of buttons in each row of buttons consisting of one unique button of said buttons, said unique buttons sequenced in a first direction within the user interface, said unique prefixes sequenced in said first direction within the user interface;
    wherein said buttons being simultaneously displayed to the user consist of:
        a Create Prefix button whose functionality consists of enabling addition of a new prefix to the currently displayed prefixes in the prefix area;
        a Remove Prefix button whose functionality consists of enabling removal a selected prefix from the prefix area;
        a Cancel button whose functionality consists of enabling cancellation of a current action;
        a Validate button whose functionality consists of enabling validation of all current actions by the user; and
        a Help button.

3. The method of claim 1, wherein the list of prefixes comprises prefixes selected from the group consisting of "Re", "Fw:", "URGENT:", "Confidential:", and combinations thereof.

4. The method of claim 1, wherein said reinserting the first string results in the first string being reinserted between brackets at the end of the subject field.

5. The computer program product of claim 2, wherein the list of prefixes comprises prefixes selected from the group consisting of "Re", "Fw:", "URGENT:", "Confidential:", and combinations thereof.

6. The computer program product of claim 2, wherein said reinserting the first string results in the first string being reinserted between brackets at the end of the subject field.

7. A system comprising a computer machine, said computer machine configured to perform a method of processing a plurality of electronic mail files, wherein each electronic mail file includes a subject field of one or more strings, the method comprising:

checking a first string in the subject field of each electronic mail file against a list of prefixes to determine whether the first string matches any of the prefixes in the list of prefixes;

removing the first string that matches a prefix in the list of prefixes and reinserting the first string at the end of the subject field and thereby producing a revised subject field; and performing a sorting operation on the revised subject fields of the electronic mail files after each electronic mail file has been checked against the list of prefixes;

displaying a user interface to a user, wherein the user interface simultaneously displays both a prefix area and buttons, said prefix area displaying the prefixes in the list of prefixes as consecutive rows of text in the prefix area, a totality of text in each row of text in the prefix area consisting of one unique prefix in the list of prefixes, said prefix area and buttons being simultaneously viewable in different spatially non-overlapping regions of the user interface, said buttons displayed in consecutive rows of buttons within a portion of the user interface that is external to the prefix area, a totality of buttons in each row of buttons consisting of one unique button of said buttons, said unique buttons sequenced in a first direction within the user interface, said unique prefixes sequenced in said first direction within the user interface;

wherein said buttons being simultaneously displayed to the user consist of:
- a Create Prefix button whose functionality consists of enabling addition of a new prefix to the currently displayed prefixes in the prefix area;
- a Remove Prefix button whose functionality consists of enabling removal a selected prefix from the prefix area;
- a Cancel button whose functionality consists of enabling cancellation of a current action;
- a Validate button whose functionality consists of enabling validation of all current action by the user; and
- a Help button.

8. The system of claim 7, wherein the list of prefixes comprises prefixes selected from the group consisting of "Re", "Fw:", "URGENT:", "Confidential:", and combinations thereof.

9. The system of claim 7, wherein said reinserting the first string results in the first string being reinserted between brackets at the end of the subject field.

10. The method of claim 1, wherein the method further comprises:
sorting the electronic mail files according to the revised subject field.

11. The method of claim 1, wherein the user interface further displays text above the prefix area and simultaneously with prefix area, said text above the prefix area identifying the prefix area as displaying the prefixes to be ignored.

12. The computer program product of claim 2, wherein the method further comprises:
sorting the electronic mail files according to the revised subject field.

13. The computer program product of claim 2, wherein the user interface further displays text above the prefix area and simultaneously with prefix area, said text above the prefix area identifying the prefix area as displaying the prefixes to be ignored.

14. The system of claim 7, wherein the method further comprises:
sorting the electronic mail files according to the revised subject field.

15. The system of claim 7, wherein the user interface further displays text above the prefix area and simultaneously with prefix area, said text above the prefix area identifying the prefix area as displaying the prefixes to be ignored.

* * * * *